United States Patent
Pong et al.

(10) Patent No.: US 11,349,192 B2
(45) Date of Patent: May 31, 2022

(54) CONTAINER LABELS

(71) Applicant: Sato Holdings Kabushiki Kaisha, Tokyo (JP)

(72) Inventors: Tai Wai Pong, St Peters (AU); Daron Green, St Peters (AU)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 102 days.

(21) Appl. No.: 16/492,306

(22) PCT Filed: Mar. 9, 2018

(86) PCT No.: PCT/IB2018/051535
§ 371 (c)(1),
(2) Date: Sep. 9, 2019

(87) PCT Pub. No.: WO2018/163111
PCT Pub. Date: Sep. 13, 2018

(65) Prior Publication Data
US 2021/0135332 A1    May 6, 2021

(30) Foreign Application Priority Data
Mar. 10, 2017  (AU) ................................ 2017900841
Aug. 31, 2017  (AU) ................................ 2017903507

(51) Int. Cl.
*H01Q 1/22*   (2006.01)
*G06K 19/077*  (2006.01)

(52) U.S. Cl.
CPC ..... *H01Q 1/2225* (2013.01); *G06K 19/07783* (2013.01); *G06K 19/07784* (2013.01)

(58) Field of Classification Search
CPC .......... G01Q 1/2225; G06K 19/07783; G06K 19/07784
(Continued)

(56) References Cited

U.S. PATENT DOCUMENTS 5,574,470 A * 11/1996 de Vall ............. G06K 19/07784
                                                            343/895
6,373,708 B1 * 4/2002 Ando ............... G06K 19/07783
                                                            235/492

(Continued)

FOREIGN PATENT DOCUMENTS

EP    1755069 A1   2/2007
EP    1898217 A2   3/2008
(Continued)

OTHER PUBLICATIONS

International Search Report dated Jun. 15, 2018, issued in counterpart International Application No. PCT/IB2018/051535(4 pages).
(Continued)

*Primary Examiner* — Michael G Lee
*Assistant Examiner* — David Tardif
(74) *Attorney, Agent, or Firm* — WHDA, LLP

(57) ABSTRACT

Described is an antenna comprising two oppositely wound antenna coils, each antenna coil formed by concentric conductor coils. An outermost conductor coil of one antenna coil is conductively connected to an outermost conductor coil of the other antenna coil via a shared conductive portion. An innermost conductor coil of each antenna coil terminates in a bridge connector, and a bridge conductively links the bridge connectors.

15 Claims, 5 Drawing Sheets

(58) Field of Classification Search
USPC .................................................... 340/572.1
See application file for complete search history.

(56) References Cited

U.S. PATENT DOCUMENTS

| | | | |
|---|---|---|---|
| 2007/0164867 A1* | 7/2007 | Kawai | G06K 19/07783 340/572.7 |
| 2007/0222602 A1 | 9/2007 | Luo et al. | |
| 2008/0063563 A1 | 3/2008 | Watari | |
| 2010/0182211 A1 | 7/2010 | Peters | |
| 2014/0049436 A1* | 2/2014 | Kubo | H01Q 1/48 343/788 |
| 2014/0266628 A1 | 9/2014 | Kawasaki | |
| 2017/0047636 A1 | 2/2017 | Lee et al. | |
| 2019/0197385 A1* | 6/2019 | Finn | H01Q 7/00 |
| 2019/0331702 A1* | 10/2019 | Menhardt | G16H 10/40 |

FOREIGN PATENT DOCUMENTS

| | | |
|---|---|---|
| JP | 2005-266963 A | 9/2005 |
| JP | 2006-276033 A | 10/2006 |
| JP | 2011-028168 A | 2/2011 |
| JP | 2015-143912 A | 8/2015 |

OTHER PUBLICATIONS

Written Opinion of the International Searching Authority dated Jun. 15, 2018, issued in counterpart International Application No. PCT/IB2018/051535(6 pages).
Written Opinion of the International Preliminary Examining Authority dated Feb. 18, 2019, issued in counterpart International Application No. PCT/IB2018/051535(8 pages).
International Preliminary Report on Patentability dated Jun. 14, 2019, issued in counterpart International Application No. PCT/IB2018/051535(26 pages including Annexes).
Office Action dated Jul. 21, 2021 Issued in EP Counterpart Application No. 18 713 726.0 (6 pages).
Office Action dated Jan. 4, 2022, issued in counterpart JP application No. 2019-549395, with English translation (14 pages).

* cited by examiner

CONTAINER LABELS

TECHNICAL FIELD

The present disclosure broadly relates to radio frequency antennas and, more particularly, a non-limiting embodiment relates to an antenna configuration and to a method of manufacturing the antenna.

BACKGROUND

Electronic tags such as radio frequency identification (RFID) tags are typically used to track and/or identify items. The RFID tags may be adhesively secured to the items, and an electronic RFID reader is then able to identify the RFID tag and associated item when the tag and reader are within a reading range of one another.

Passive RFID tags have an antenna in the form of a conductive coil, and use magnetic field energy from the RFID reader that passes through the coil area to generate an electrical voltage to be received by the reader for enabling the reader to identify the tag. The generated electrical voltage governs the reading range and therefore how well the information from the RFID tag can be read.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Using electronic tags to label cylindrical objects such as a cylindrical container (e.g. a bottle, vial, etc.) is challenging because only half the circumference of the object can be used to wrap a conventional RFID tag antenna around. This is so as to avoid generating a reversed voltage on an opposite side of the cylindrical object that would then reduce the effective collecting area and therefore the total induced voltage required when the tag is interrogated by an electronic reader.

When electronic labels are used for batches of test tubes the space available for labelling may be reduced even further. For example, where the test tubes are held in conventional test tube holders, the test tubes fit snuggly into the holders to avoid damage to the test tubes e.g. during transportation. Consequently little or no additional space is available around the circumference of the test tubes along that part of the length of the test tube that fits into the holder. Consequently, the area around the test tubes available for labelling is reduced to a top portion of each test tube that protrudes above the test tube holder.

It would be useful to have an electronic label with an antenna configured so that the electronic label can fit around a cylindrical object, especially where there is limited space to apply the label.

In one aspect there is provided an antenna comprising: two oppositely wound antenna coils, each antenna coil formed by concentric conductor coils, wherein an outermost conductor coil of one antenna coil is conductively connected to an outermost conductor coil of the other antenna coil via a shared conductive portion, and wherein an innermost conductor coil of each antenna coil terminates in a bridge connector; and a bridge conductively linking the bridge connectors, wherein the antenna is flexible so that the two antenna coils are able to be positioned about an article so as to functionally align, in spaced relationship, an inner area of one antenna coil on one side of the article with an inner area of the other antenna coil on an opposite side of the article thereby increasing an effective induced EMF, in use.

Each bridge connector may be located within its associated antenna coil. A single bridge may conductively link the two antenna coils via the bridge connectors. The antenna may be fabricated using at least one of an etching technique and an additive manufacturing technique. The antenna may have a length of less than about 5 cm and a width of less than about 2 cm.

A magnetic field provided by an electronic reader may pass through the article and induce the EMF in the two oppositely wound antenna coils positioned on opposite sides of the article. The antenna may be configured to be arranged about a cylindrical article so that a first end of the antenna lies adjacent a second end of the antenna. The antenna may be an RFID antenna.

In another aspect there is provided an antenna comprising: two oppositely wound antenna coils, each antenna coil formed by concentric conductor coils, wherein an outermost conductor coil of one antenna coil is conductively connected to an outermost conductor coil of the other antenna coil, and wherein an innermost conductor coil of each antenna coil terminates in a bridge connector; and a bridge conductively linking the bridge connectors, wherein the antenna is flexible so that the two antenna coils are able to be positioned about an article so as to functionally align, in spaced relationship, an inner area of one antenna coil on one side of the article with an inner area of the other antenna coil on an opposite side of the article thereby increasing an effective induced EMF, in use.

The antenna may be flexible so that the two antenna coils are able to be positioned about an article so as to functionally align an inner area of one antenna coil with an inner area of the other antenna coil.

In another aspect there is provided an electronic label comprising the antenna as described above. The electronic label may be an RFID label. In another aspect there is provided a test tube labelled with the electronic label.

In another aspect there is provided a method of manufacturing an antenna comprising: providing a strip of material: working the strip of material to form two oppositely wound antenna coils, each antenna coil formed by concentric conductor coils, wherein an outermost conductor coil of one antenna coil is conductively connected to an outermost conductor coil of the other antenna coil via a shared conductive portion, and wherein an innermost conductor coil of each antenna coil terminates in a bridge connector; and applying a bridge to conductively link the bridge connectors.

The method may include providing the strip on a carrier. The method may include working the material by at least one of an etching technique and an additive manufacturing technique. The method may include applying a single bridge to the bridge connectors.

In another aspect there is provided a method of manufacturing an electronic label as described above.

When electronic labels are used for medical sample containers, there are particular challenges. For example, identifying and prioritising one or more samples within a large batch may be difficult. This is particularly challenging where batches of samples are held in one or more cooler bags, the contents of which may not be visible from outside the bags, for example if the bags are opaque.

Another challenge for labelling medical samples relates to handling sensitive information in a secure way. In particular for urgent samples it can be a challenge to keep information secure and available as and when required, particularly if the sample and its associated information are separated.

In another aspect there is provided a system for identifying a container labelled with the electronic label as described above with stored container data comprising a tag identity of the container, the system comprising: an electronic reader configured to interrogate one or more electronic labels to retrieve tag data from each of the one or more electronic labels; and a processer that receives the retrieved tag data from the electronic reader and if the retrieved tag data includes the tag identity, the processor identifies the container.

The electronic label may comprise the antenna described above.

The processor may be configured to determine if the tag identity comprises a priority tag identity, and if the tag identity comprises the priority tag identity the system identifies the container as a priority container.

The container data may comprise sample information associated with contents of the container.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

These and other aspects and features of non-limiting embodiments will now become apparent to those skilled in the art upon review of the following description of specific non-limiting embodiments in conjunction with the accompanying drawings.

BRIEF DESCRIPTION OF DRAWINGS

Non-limiting embodiments of the disclosure are now described by way of example with reference to the accompanying drawings in which:—

In the drawings, like reference numerals designate similar parts.

DETAILED DESCRIPTION

Figure 1:
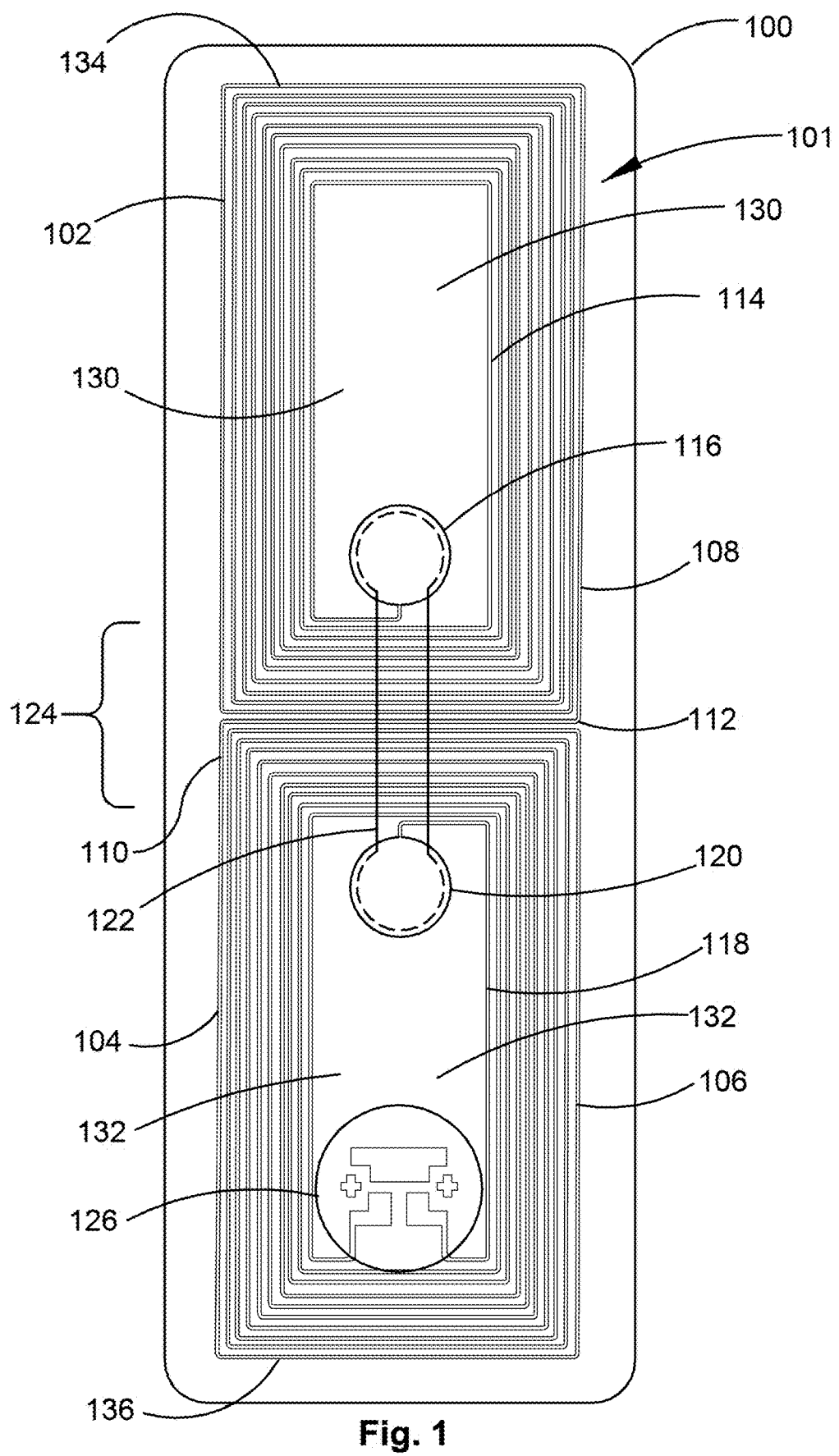
FIG. 1 is a schematic representation of a non-limiting embodiment of an antenna.

FIG. 1 of the drawings shows an electronic tag 100 in the form of a radio frequency identification (RFID) tag with an antenna 101. The antenna 101 has a first wound antenna coil 102 and a second oppositely wound antenna coil 104. The two oppositely wound antenna coils 102, 104 are each formed by concentric conductor coils 106. An outermost conductor coil 108 of the first antenna coil 102 is conductively connected to an outermost conductor coil 110 of the second antenna coil 104 via a shared, common conductive portion 112. An innermost conductor coil 114 of the first antenna coil 102 terminates in a bridge connector 116, and an innermost conductor coil 118 of the second antenna coil 104 also terminates in a bridge connector 120. A bridge 122 conductively links the bridge connectors 116, 120.

In this non-limiting embodiment the shared conductive portion 112 is formed by a shared portion of the outermost coil of each antenna coil. In an alternative non-limiting embodiment, the shared conductive portion may be provided by another type of conductive link, for example with two bridge connectors and an additional bridge. In another alternative non-limiting embodiment, two antenna coils that are oppositely wound are connected by a shared mounting pad that forms the conductive connection between the two oppositely wound pads.

In one non-limiting embodiment, the antenna 101 is made using an etching technique where a strip of material (for example aluminium) is provided on a non-conductive carrier or substrate, typically a flexible material, for example a polymer or plastic sheet. In some non-limiting embodiments the carrier includes an adhesive underside to attach the RFID tag 100 to an item. The strip of material is worked, for example, by the etching technique, to form the two oppositely wound antenna coils 102, 104 and the bridge connectors 116, 120, each bridge connector located within its associated antenna coil. Once formed, the antenna coils 102, 104 are covered with an insulating material, while the bridge connectors 116, 120 remain exposed. The bridge 122 (also made of a conductive material, for example aluminium) is then applied by adhesively securing each end of the bridge 122 to a respective one of the bridge connectors 116, 120 using a conductive glue. The bridge 122 is isolated from the antenna coil tracks 124 underneath the bridge by the insulating material that covers at least part of the antenna coils 102, 104.

The RFID tag 100 also includes an electrical interface in the form of a mount pad 126 that connects the antenna 100 to an identification chip (not shown) of the RFID tag 100.

The RFID tag 100, and the components that form part of the RFID tag 100 such as the antenna 101, may be made from a flexible material so that the RFID tag 100 and antenna 101 may be positioned about an article or object, for example a cylindrical article.

How this antenna configuration increases the collection of magnetic field, thereby effectively extending the reading range capability of the RFID tag, may be understood with reference to FIG. 2A, FIG. 2B, FIG. 3A, and FIG. 3B of the drawings.

Figure 2A:
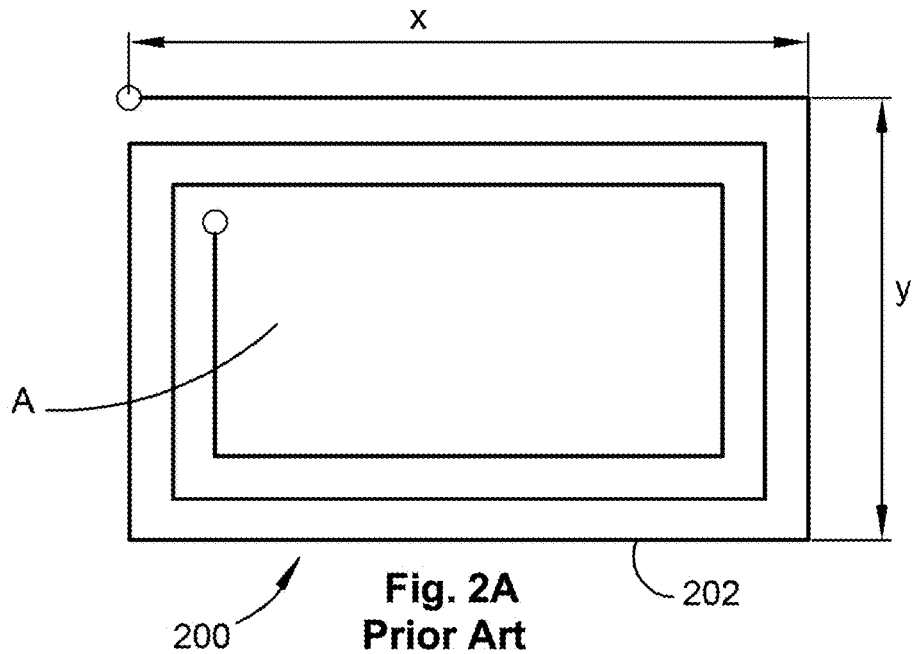
FIG. 2A is a diagram of a prior art antenna.

FIG. 2A of the drawings shows a prior art, conventional simple antenna 200. Antenna 200 is made up of a single conductive coil 202, having multiple turns or coil conductors, with a length x and a width y so that the area A bounded by the coil 202 is approximately given by A=x×y. According to Faraday's law, magnetic flux $\Phi_B$ through a surface bounded by a coil is defined by a surface integral with respect to the area A bounded by the coil:

$$\Phi_B = \iint B dA \qquad \text{Eq. 1}$$

where B is the magnetic field.

The coil acquires an electromotive force, EMF (or voltage) as defined by the rate of change of the magnetic flux.

For the type of tightly wound coil used here, the voltage is proportional to the number of turns, N, of the coil:

$$\varepsilon = -N\frac{d\Phi}{dt}$$ Eq. 2

Therefore, the larger the area A bounded by the coil, the larger the voltage produced by the coil when interrogated by an RFID reader.

Figure 2B:
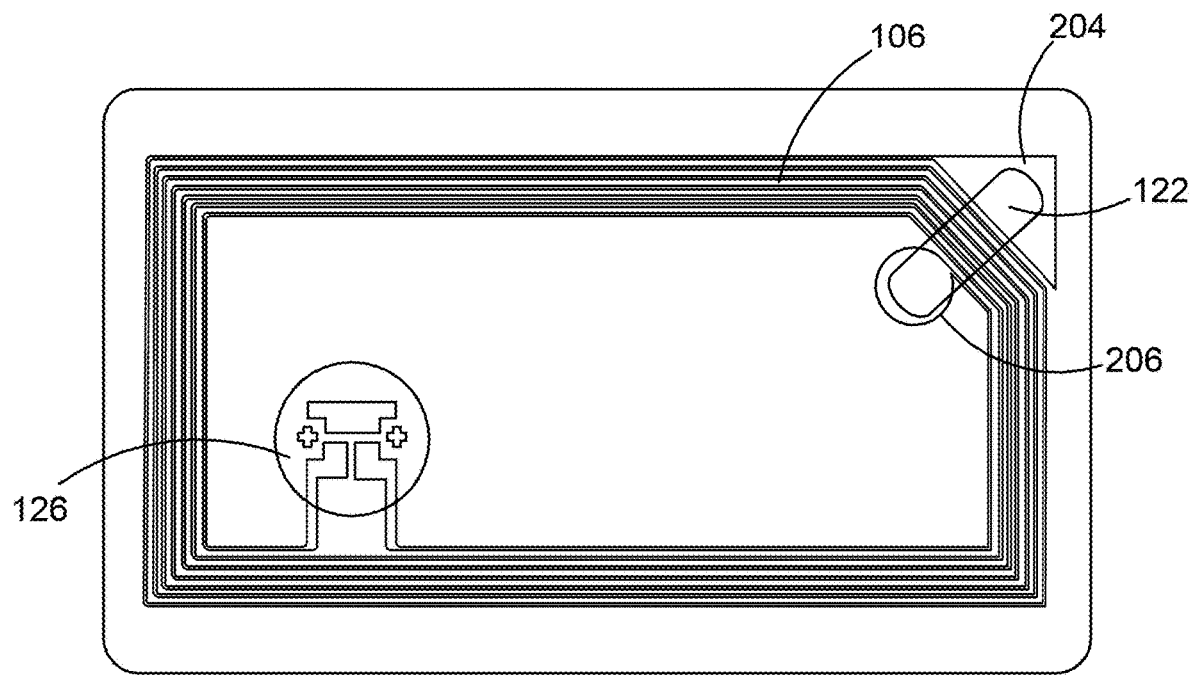
FIG. 2B is a schematic representation of an implementation of the prior art antenna of FIG. 2A.

The practical implementation of the conventional simple antenna is shown in FIG. 2B. The conductive coil 106 is in fact wound outward from the mount pad 126 to an outer bridge connector 204, and inward from the mount pad 126 to an inner bridge connector 206. The inner bridge connector 206 and the outer bridge connector 204 are then conductively connected by the bridge 122.

Figure 3A:
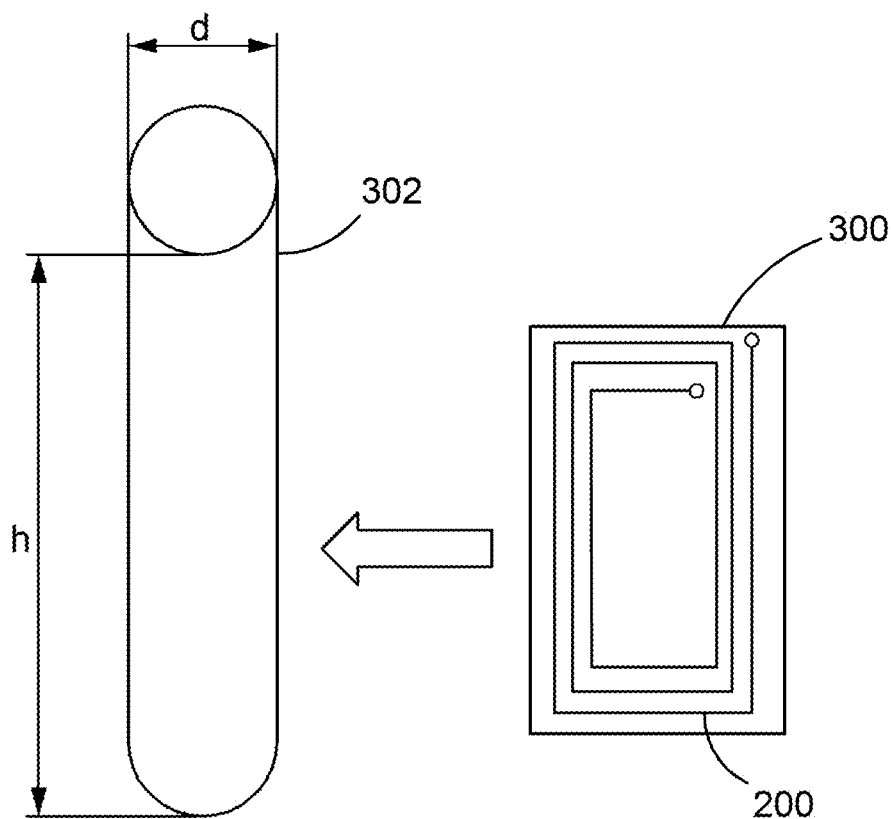
FIG. 3A illustrates the application of a prior art antenna to a test tube.
Figure 3B:
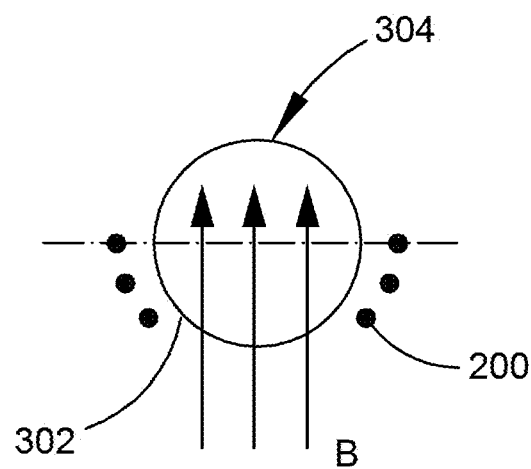
FIG. 3B is a section through the test tube and antenna of FIG. 3A.

FIG. 3A of the drawings is a schematic representation of a tag 300 with the antenna 200 of FIG. 2A applied to a cylindrical shape such as a test tube 302. In this application, the magnetic field collecting area A is constrained by the height h and diameter d of the test tube 302. Furthermore, as illustrated in FIG. 3B, the width y of antenna 200 is limited to half the circumference of the tube 302 to avoid generating a reversed voltage when the magnetic field B, as shown by the arrows, passes through the area A. Such a reversed voltage on the opposite side 304 of the test tube 302 would reduce the effective collecting area and therefore the total induced voltage.

Figure 4A:
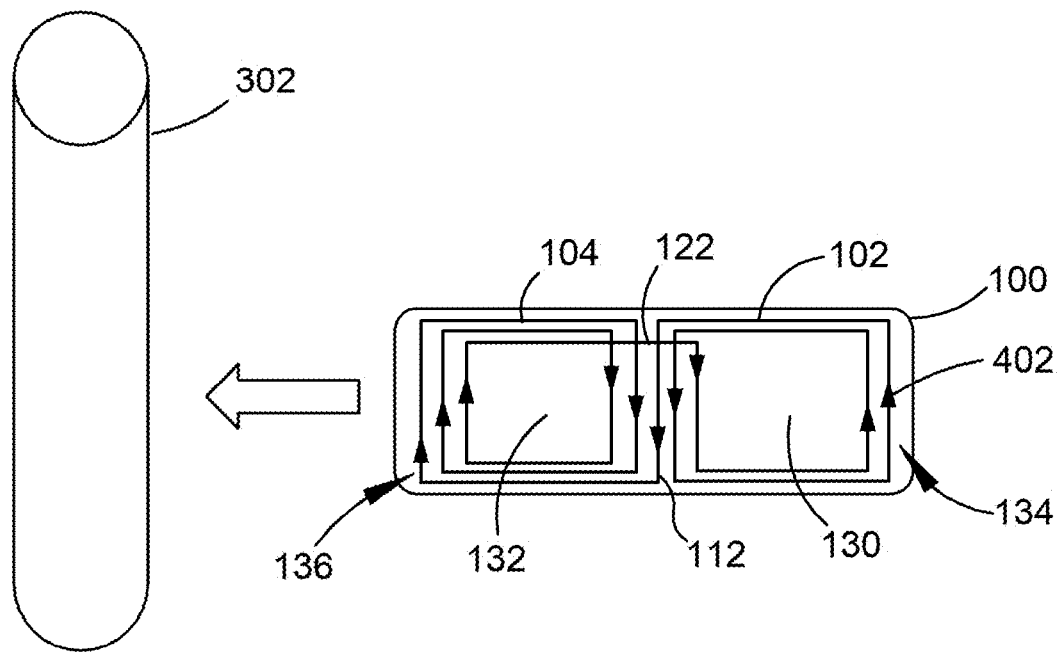
FIG. 4A illustrates the application of the non-limiting embodiment of the antenna of FIG. 1 to a test tube.
Figure 4B:
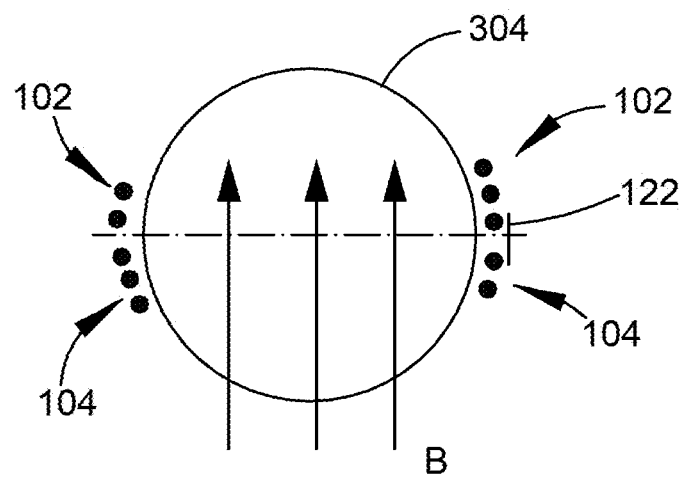
FIG. 4B is a section through the test tube and antenna of FIG. 4A.

The antenna 101 as shown in FIG. 1 facilitates more efficient use of the surface area around a 3-dimensional shape such as a cylindrical test tube because the surface on opposite sides of the shape can then be used to adhere the antenna to. This is illustrated in FIG. 4A and FIG. 4B. With the flexible RFID tag 100 and antenna 101, the two antenna coils 102, 104 are able to be positioned about an article such as the test tube 302 so as to functionally align the inner area 130 of one antenna coil 102 with the inner area 132 of the other antenna coil 104. In other words, in the case of the test tube 302, the tag 100 is able to be wrapped around the entire circumference of the test tube.

The opposite winding of the two antenna coils 102, 104 means that on a flat surface, the two coils 102, 104 will generate counter-acting voltages that will cancel one another. This is illustrated by arrows 402 in FIG. 4A indicating the example of a clockwise direction around coil 104 as opposed to the counter clockwise direction around coil 102. However, when the RFID tag 100 is wrapped around a surface with one end 134 of the antenna 101 lying adjacent the other end 136 of the antenna as shown in FIG. 4B, one of the two coils will effectively be reversed in orientation. The opposite directions of the induced EMF will then in fact add together, thereby increasing (or even doubling) the effective induced EMF due to increasing the number of turns, N, of the coil (see Eq. 2).

In FIG. 1, each coil has 10 turns, N=10. This number can vary according to the application (for example based on the EMF required and the space available), and can range between about 3 and 20, typically between 5 and 15 as more than 15 turns tends to reduce the self-resonant frequency and could impede the receiver circuit when two or more tags are close together.

In some non-limiting embodiments, the RFID tag 100 is not adhered to an item, but instead is folded double providing a compact yet effective RFID.

Some non-limiting embodiments may include an extended multi-coil configuration of the antenna arranged in series, with each adjacent pair of coils being oppositely wound and interconnected by a bridge. For example, with three adjacent coils, two bridges would be required For the two-coil configuration, a single bridge is required.

Advantages of the two-coil and single-bridge antenna as described herein is that this type of configuration can easily be mass produced using, for example, foil etching or printing. For a typical figure-of-eight configuration, for example, where coils cross over on each loop, conventional subtractive or additive manufacturing (such as etching or 3D printing) is not feasible at least because a pair of bridge connectors is required for each cross over, and as can be seen in FIG. 1 the bridge connectors 116, 120 can take up a relatively large portion of the surface area within the area bounded by each coil.

The simple linked 2-coil configuration that is manufactured using, for example, an etching technique also allows for relatively small RFID tags that can be used on test tubes and other small items. A test tube may be limited in size to, for example, a 12 mm diameter and a height of 50 mm. In one non-limiting embodiment, the RFID tag 100 has an antenna 101 with a total height of 10-20 mm, for example 11 mm, and a total width to wrap around an item of 30-70 mm, for example 38 mm.

Having only a single bridge that crosses other conducting portions of the coil also results in less parasitic capacitance, thereby improving the performance of the coil. This means that the resonant frequency of the antenna is not so close to the operating frequency to compromise reply signals when two or more tags are close together. For example, where a reply from an RFID tag is expected at around 16.3 MHz, a 17 MHz resonant frequency caused by stray capacitance of a figure-of-eight type configuration could swamp small reply signals. For the proposed antenna configuration with 10 turns, the measured resonant frequency is 23.9 MHz. This provides a significant performance improvement over a figure-of-eight type configuration that has a measured resonant frequency of 17 MHz for an equivalent 10 turn structure.

Figure 5:
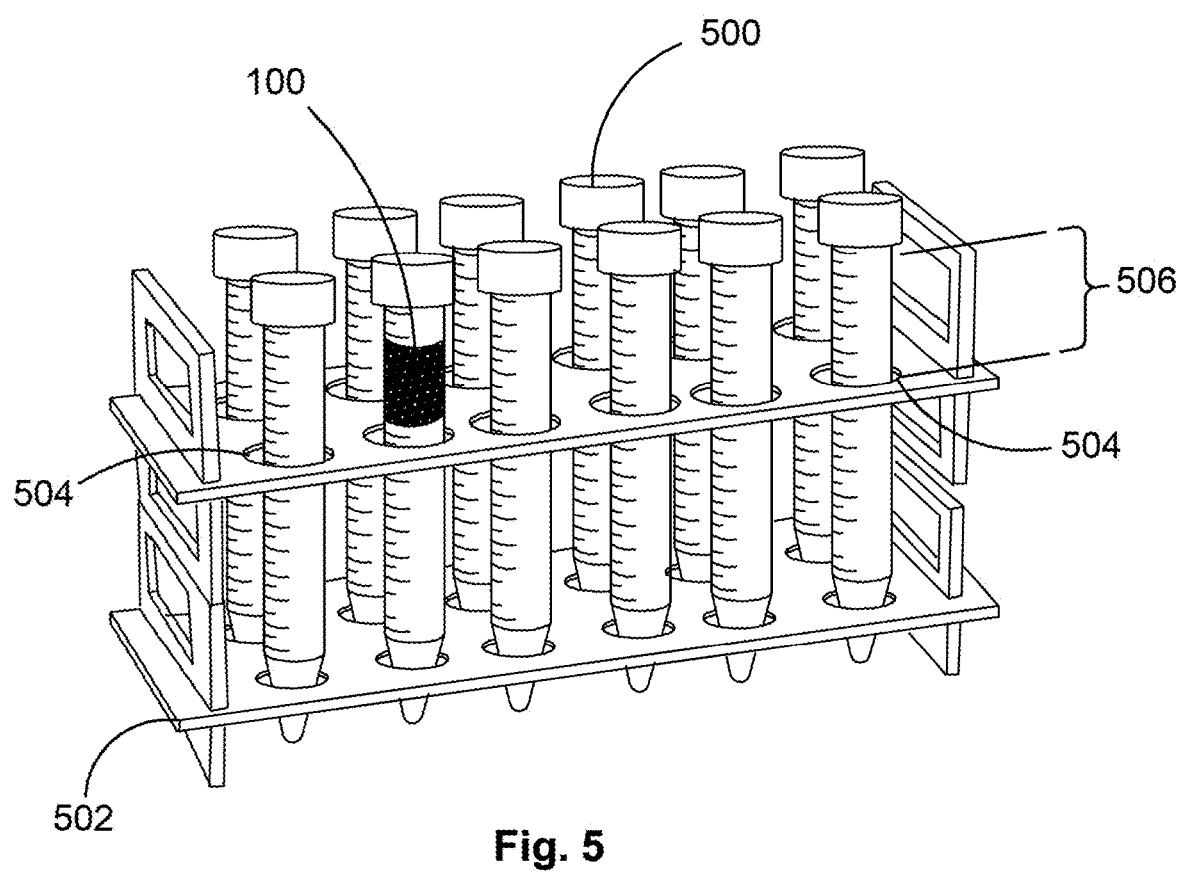
FIG. 5 illustrates the application of the non-limiting embodiment of the antenna of FIG. 1 to test tubes held in a test tube rack.

Advantageously, the antenna configuration described herein makes it possible to use a physically smaller electronic tag because there are effectively two collecting areas (one on either side of the cylinder), both contributing to the magnetic flux and resulting voltage. This type of slimmer wrap-around label can be used to label test tubes 500 that are held in a test tube holder 502 with a snug fit, as illustrated in FIG. 5 of the drawings.

The portion of the test tube 500 that is held closely by the holder 502, referred to here as the holding zone 504, cannot accommodate an electronic label (with an antenna and associated dimensions) due to the restricted space between the holding zone 504 of the test tube 500 and the holder 502. Consequently, the area around the test tube available for a tag is reduced to an upper circumferential area 506. The electronic tag 100 described herein is well suited to being wrapped around this upper circumferential area 506.

In some non-limiting embodiments, having the electronic tag 100 as a visible label on this upper circumferential area 506 advantageously also provides a visible cue that a particular test tube in the holder is labelled. This can be used, for example to indicate the presence of an urgent sample that should be prioritised. Providing, for example, distinctive colour coding on a label that is applied to the upper circumferential area 506 can aid in the identification of a holder 502 with an urgent test tube.

In the example of batches of medical samples held in one or more cooler bags, the contents of which may not be visible from the outside the bags, identifying and prioritising one or more samples within a large batch or amongst several cooler bags may be difficult. Applying an electronic label, such as the RFID tags described herein, provides a way of identifying urgent samples. If a cooler bag of samples is, for example, placed in an RFID tunnel reader (or scanned by a hand-held RFID reader), the tag identities read by the reader may be configured so that the RFID system recognises the presence of priority tag identities. In this way, a user is able to identify cooler bags that contain priority sample containers labelled with RFID tags that have priority tag identities.

Another challenge for labelling medical samples relates to handling sensitive information in a secure way. In particular for urgent samples it can be a challenge to keep information secure and available as and when required, particularly if the sample and its associated information are separated. Including all required information, such as urgent and/or sensitive information, as part of the electronic data stored on the electronic label attached to a sample means that the information travels with the sample and is not transmitted over a potentially insecure communications network. Using an RFID tag that has sample information stored on the tag avoids exposing sensitive information associated with the contents of the container to risks on insecure communications networks, and also avoids the cost of securing the communications network.

It is noted that the foregoing has outlined some of the more pertinent non-limiting embodiments. It will be clear to those skilled in the art that modifications to the disclosed non-limiting embodiments can be effected without departing from the scope thereof. As such, the described non-limiting embodiments ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiments is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

The invention claimed is:

1. An antenna comprising:
   two oppositely wound antenna coils, each antenna coil formed by concentric conductor coils,
   wherein an outermost conductor coil of one antenna coil is conductively connected to an outermost conductor coil of the other antenna coil via a shared conductive portion, and
   wherein an innermost conductor coil of each antenna coil terminates in a bridge connector; and
   a bridge conductively linking the bridge connectors,
   wherein the antenna is flexible so that the outermost conductor coils of the two antenna coils are conductively connected via a shared, common conductive portion, and
   so that the two antenna coils are configured to be positioned on opposite sides of a cylindrical article so as to functionally align, in spaced relationship relative to each other, an inner area of one antenna coil on one side of the article with an inner area of the other antenna coil on an opposite side of the article,
   such that one of the two coils is effectively reversed in orientation in order for the induced electromagnetic force, EMF, from the two coils to add together, thereby increasing the effective induced EMF due to increasing the number of concentric conductor coils that result in the induced EMF.

2. The antenna of claim 1, wherein each bridge connector is located within its associated antenna coil.

3. The antenna of claim 1, wherein a single bridge conductively links the two antenna coils via the bridge connectors.

4. The antenna of claim 1, wherein the antenna is fabricated using at least one of an etching technique and an additive manufacturing technique.

5. The antenna of claim 1, which has a length of less than about 5 cm and a width of less than about 2 cm.

6. The antenna of claim 1, wherein a magnetic field provided by an electronic reader passes through the article and induces the EMF in the two oppositely wound antenna coils positioned on opposite sides of the article.

7. The antenna of claim 6, which is configured to be arranged about a cylindrical article so that a first end of the antenna lies adjacent a second end of the antenna.

8. The antenna of claim 1, wherein the antenna is an RFID antenna.

9. The antenna of claim 1 in which the shared conductive portion is formed by a shared portion of the outermost coil of each antenna coil.

10. An electronic label comprising the antenna of claim 1.

11. The electronic label of claim 10 that is an RFID label.

12. A test tube labelled with the electronic label of claim 10.

13. A system for identifying a container labelled with the electronic label of claim 10 with stored container data comprising a tag identity of the container, the system comprising:
   an electronic reader configured to interrogate one or more electronic labels to retrieve tag data from each of the one or more electronic labels; and
   a processor that receives the retrieved tag data from the electronic reader and if the retrieved tag data includes the tag identity, the processor identifies the container.

14. The system of claim 13, wherein the processor is configured to determine if the tag identity comprises a priority tag identity, and if the tag identity comprises the priority tag identity the system identifies the container as a priority container.

15. The system of claim 13, wherein the container data comprises sample information associated with contents of the container.

* * * * *